Dec. 22, 1970        J. L. DICKMANN        3,548,692
WELL PIPE TONGS
Filed June 17, 1968        9 Sheets-Sheet 1
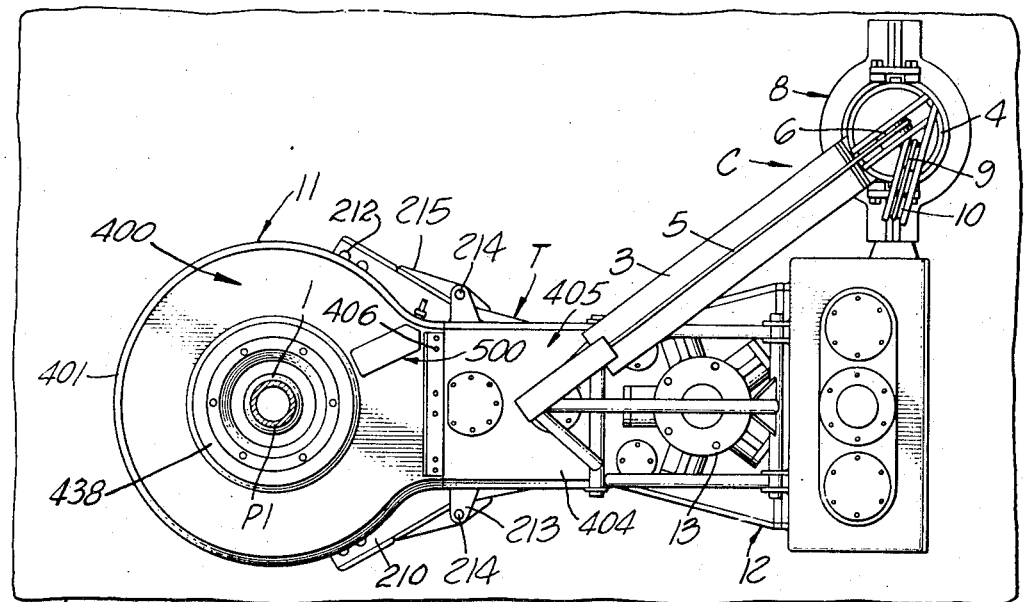
FIG. 1.
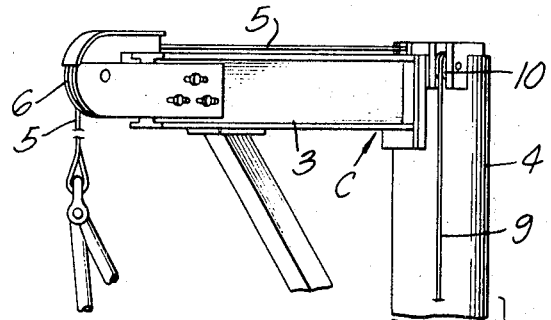
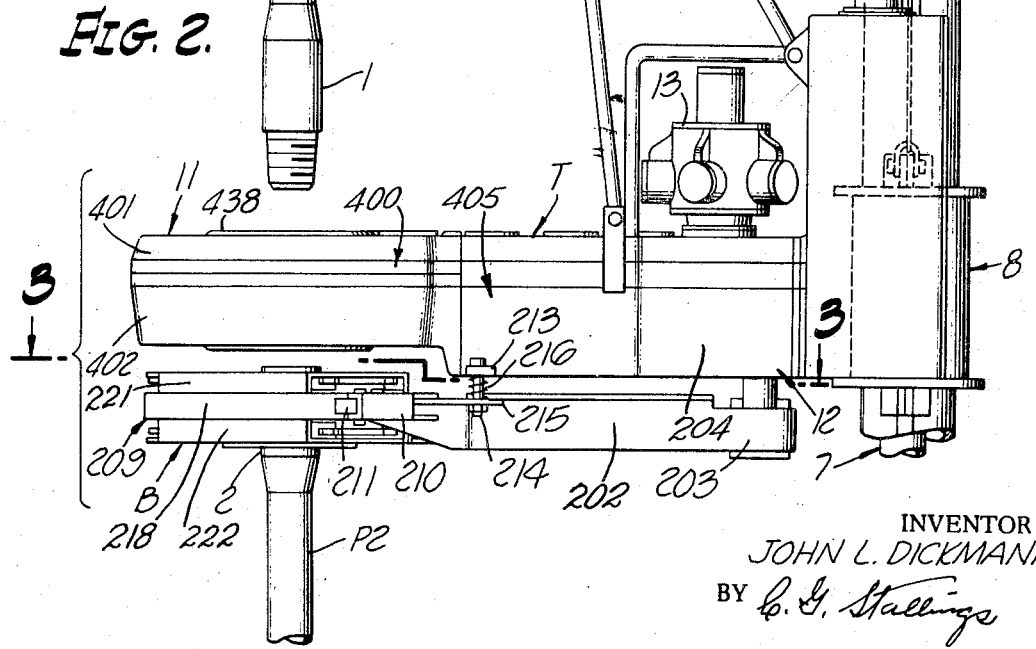
FIG. 2.
INVENTOR
JOHN L. DICKMANN
BY C. G. Stallings
ATTORNEY

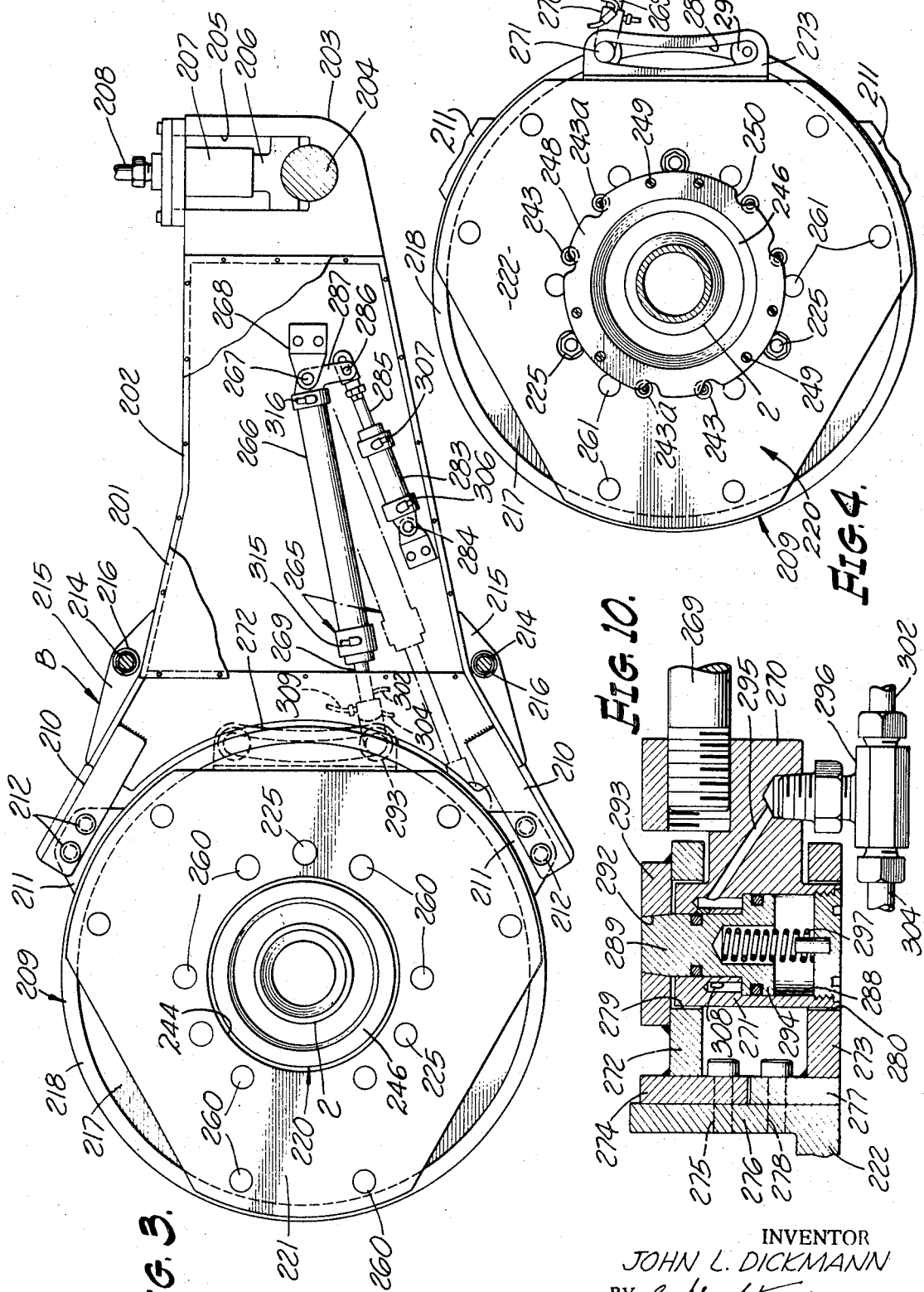

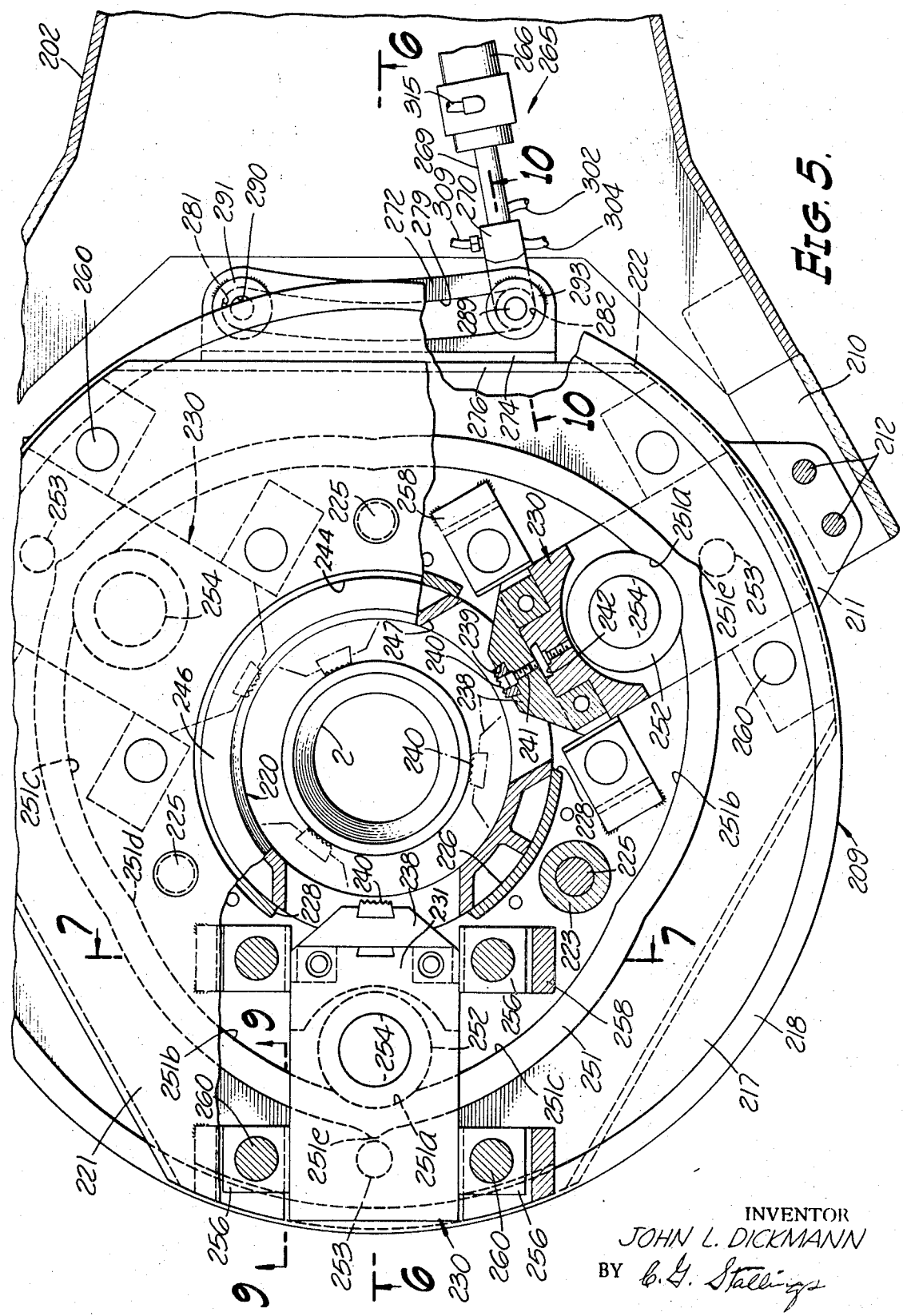

Dec. 22, 1970     J. L. DICKMANN     3,548,692
WELL PIPE TONGS
Filed June 17, 1968     9 Sheets-Sheet 4
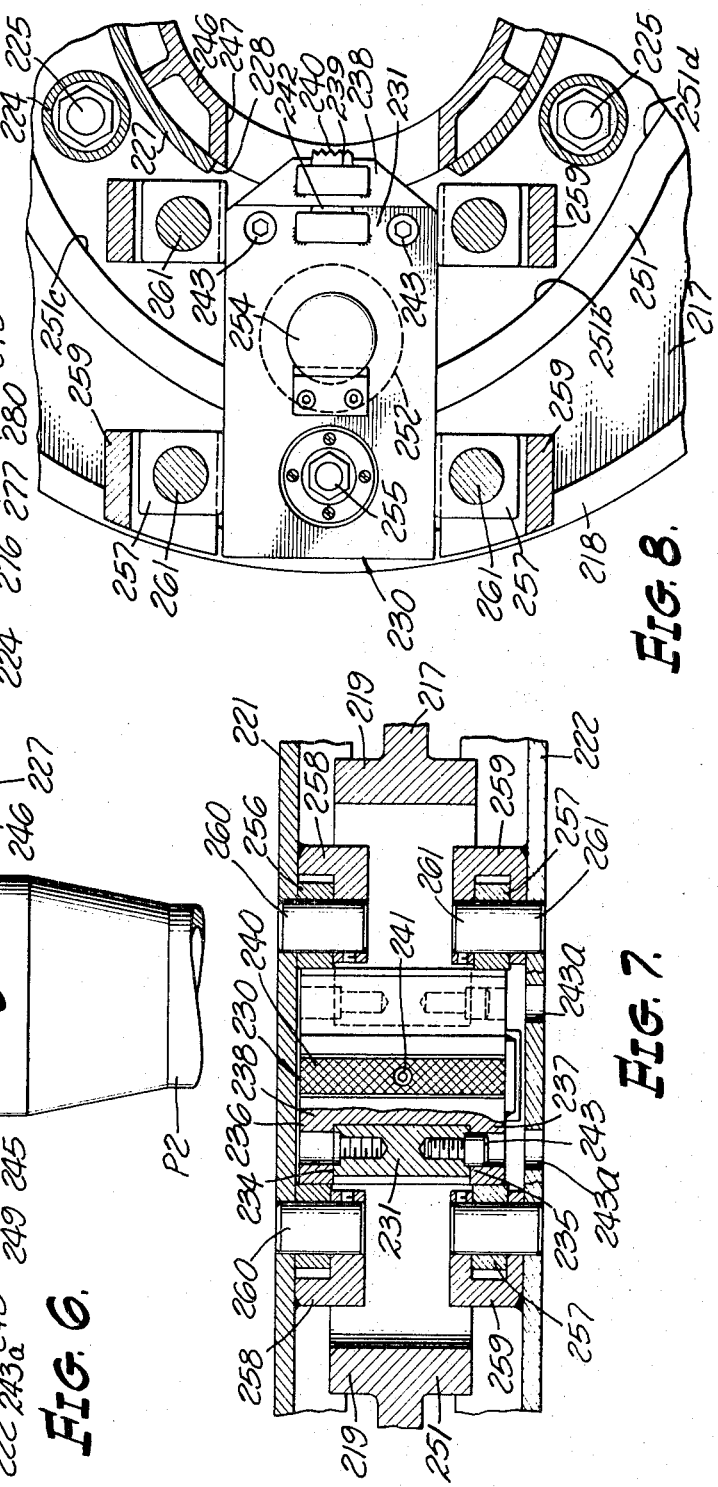
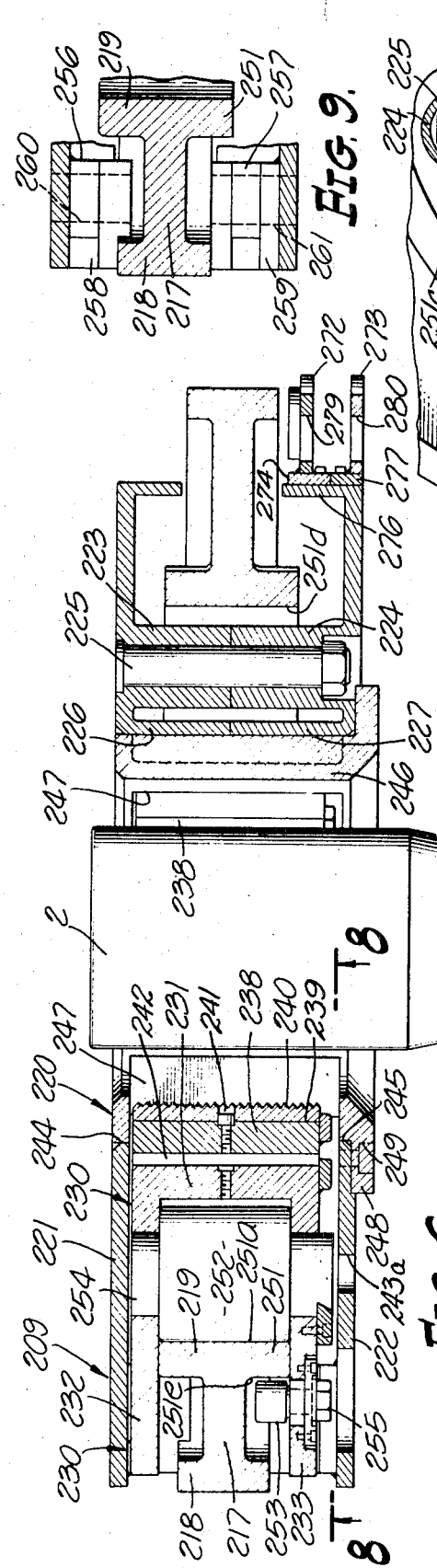
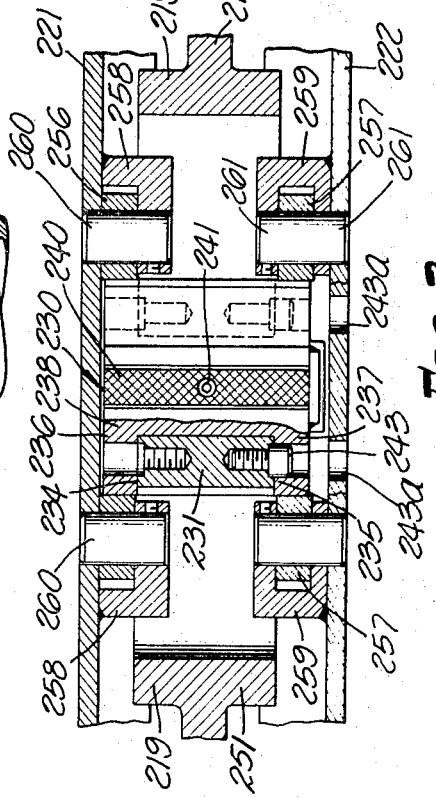
INVENTOR
JOHN L. DICKMANN
BY *C. H. Stallings*
ATTORNEY

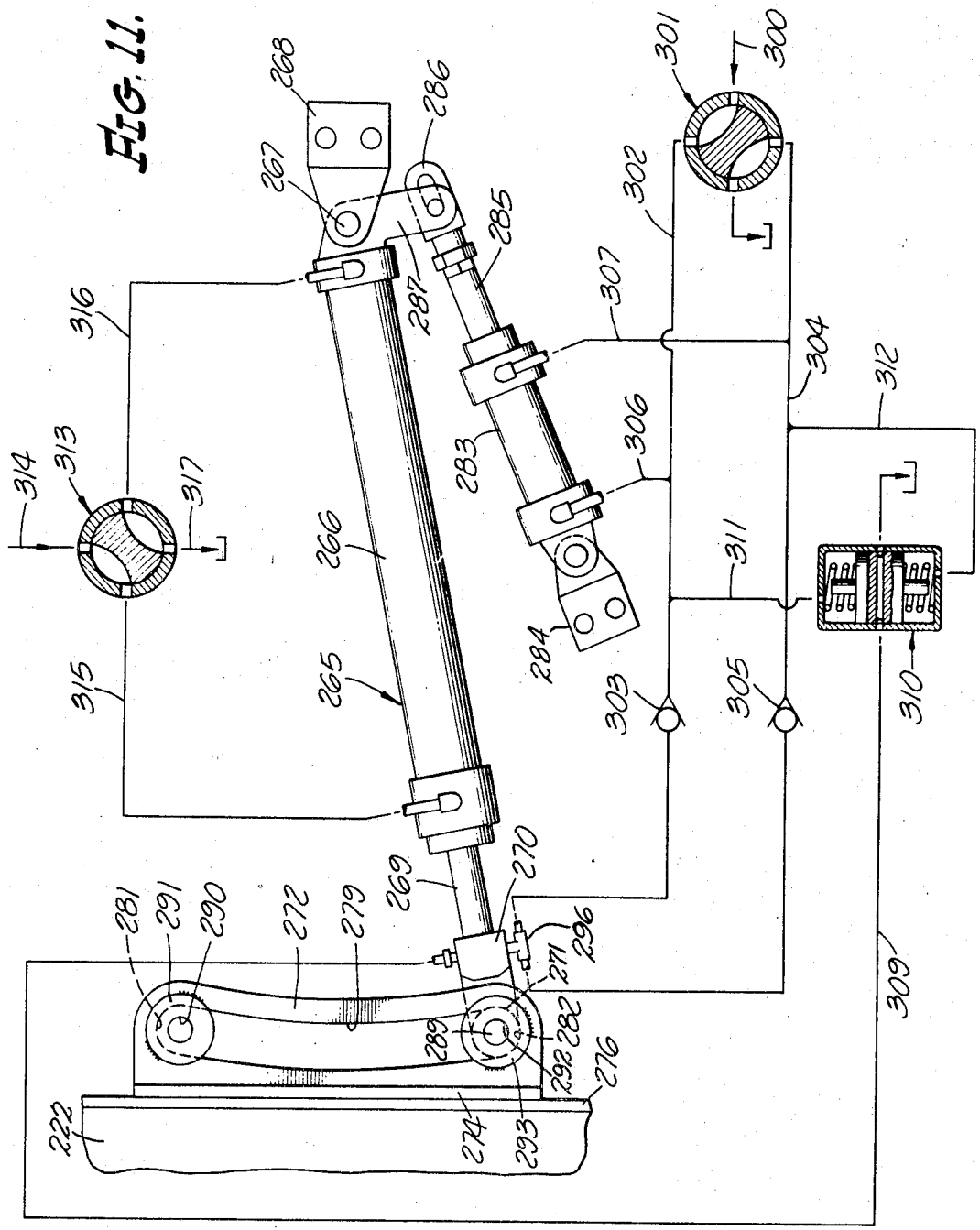

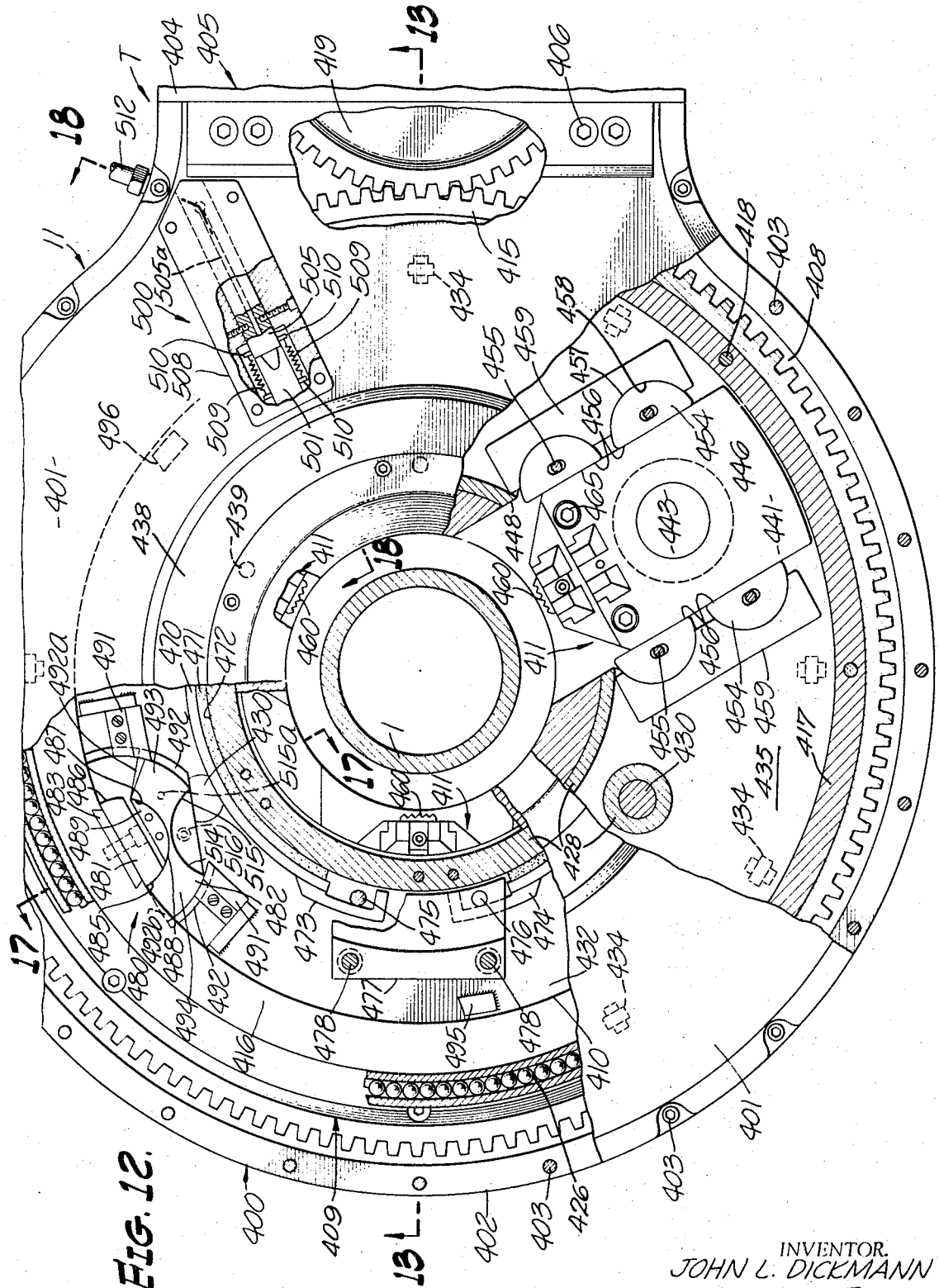

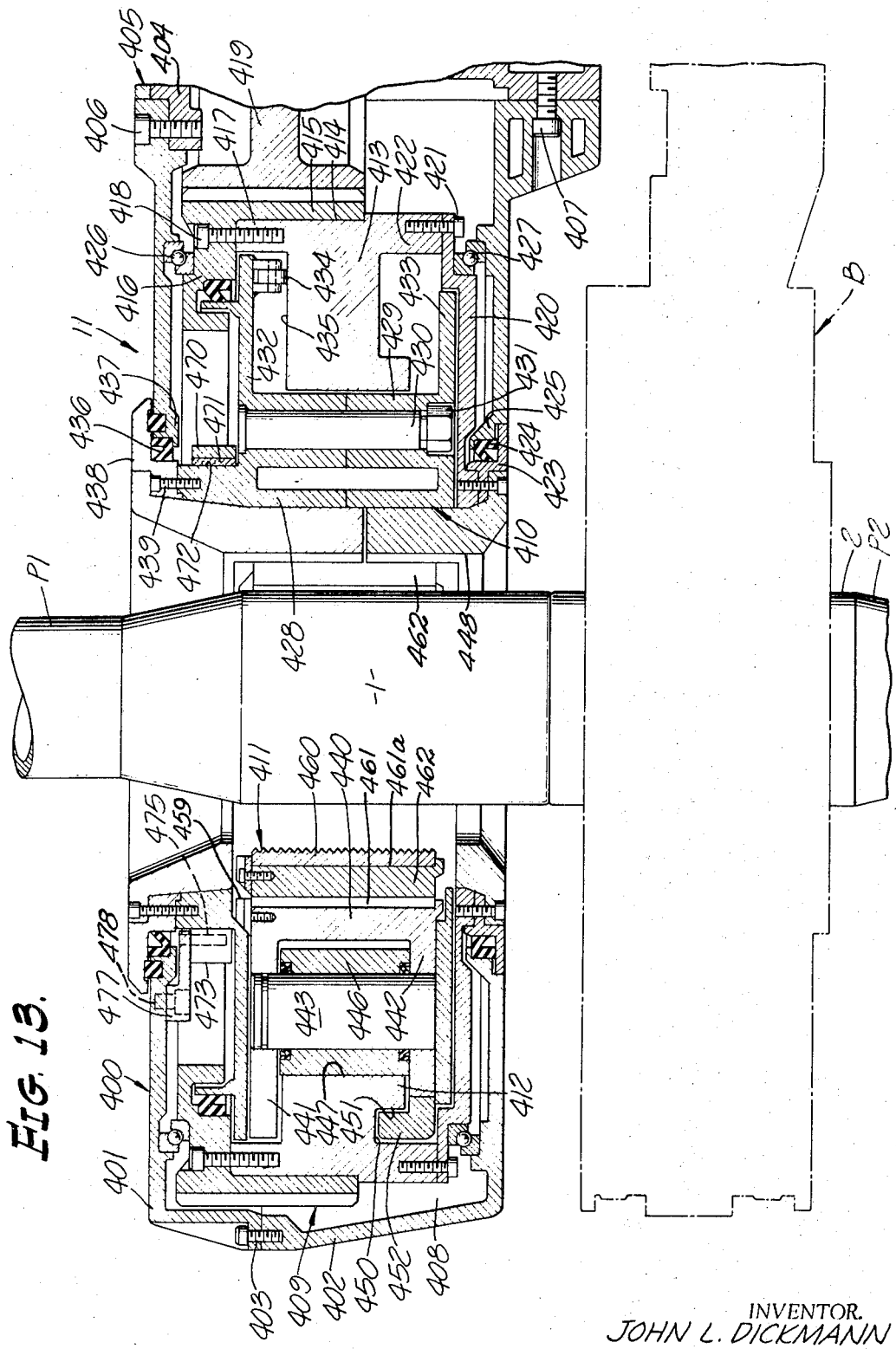

INVENTOR.
JOHN L. DICKMANN
BY C. G. Stallings
ATTORNEY

United States Patent Office 3,548,692
Patented Dec. 22, 1970

3,548,692
WELL PIPE TONGS
John L. Dickmann, Whittier, Calif., assignor to Byron Jackson Inc., Long Beach, Calif., a corporation of Delaware
Filed June 17, 1968, Ser. No. 737,523
The portion of the term of the patent subsequent to Apr. 21, 1987, has been disclaimed
Int. Cl. B25b 17/00
U.S. Cl. 81—57.18                                6 Claims

ABSTRACT OF THE DISCLOSURE

Well pipe tongs including pipe-gripping jaws positively operable to grip pipe therebetween and positively retractable in response to initial relative rotation of a jaw carrying ring and a cam ring mounted one within the other. Such tongs disposed beneath a power-operated tong to back up the power tong so as to make up and break out pipe joints, one joint part of which may be gripped in the back-up tong and a hydraulic cylinder being connected selectively to angularly spaced locations on the jaw carrying ring to enable actuation of the jaw carrying ring in opposite directions relative to the support structure. Such tongs in which the relative rotation of the jaw carrying ring and the cam ring is effected by a drive gear.

CROSS-REFERENCES TO RELATED APPLICATIONS

This application is a continuation-in-part of application Ser. No. 687,810, filed Dec. 4, 1967 for Back-Up Tong for Power Pipe Tongs, now U.S. Pat. No. 3,507,174.

BACKGROUND OF THE INVENTION

The present invention relates to pipe tongs, and more particularly to pipe-gripping means adapted to be employed in a back-up tong or in a power driven tong, so that the parts of a joint of well pipe may be made up or broken out.

In the operation of power pipe tongs to make up and break out joints in well pipe, such as drill pipe, casing or tubing, all herein generally referred to as pipe, it is necessary that the length of pipe disposed in the well bore be held stationary during rotation of the length of pipe suspended in the derrick. While the length of pipe suspended in the derrick or the length of pipe disposed in the well bore may be rotated rapidly during the initial stages of making up the joint or in the latter stages of breaking out the joint, such rapid rotation being known as "spinning" and being accomplished either by rapid drive or a power driven power tong or rapid rotation of the rotary table supporting the length of pipe in the well bore, it is necessary during the final stages of making up the pipe joint or during the initial stage of breaking out the pipe joint that the length of pipe disposed in the well bore be tightly held as high torque is applied by the power pipe tong either to finally make up the joint or initially break out the joint, as the case may be. Accordingly, it is the practice to employ a "back-up" tong at least during the high torque stages of the operation of making up and breaking out the pipe joints, and such back-up tongs have variously been conventional hand tongs secured to a post of the derrick by a cable, or back-up tongs combined with the power tong which operates on the length of pipe supported in the derrick. It is desirable that the back-up tong be quickly engageable with and releasable from the length of pipe disposed in the well bore so as to minimize loss of time and so as to eliminate the imposition of an axial force on the power driven tong and the back-up tong, when such tongs are used in combination, which axial force is occasioned by the relative axial movement of the pipe joint as the threads are being rapidly relatively rotated during the spinning operation.

Gripping of the pipe joint parts during the high torque phases of making up and breaking out the tool joints poses problems due to the range of pipe sizes and variation in the condition of the tool joints engageable by the tong dies.

SUMMARY

An object of the present invention is to provide a pipe-gripping head applicable to back-up tongs and to power tongs in which the pipe-gripping means are adapted to be actuated into gripping engagement with the pipe as well as positively actuated out of gripping engagement with the pipe.

The invention provides pipe-gripping means for a back-up tong assembly, or the like, in which the pipe-gripping means are jaws actuatable into pipe-gripping engagement with the pipe in response to rotation of a jaw carrying ring in either direction, the ring being operable by a pressure cylinder which is shiftable between a first position in which the cylinder will move the ring in one direction, and a second position at which the ring will move in the other direction.

The invention also provides a pipe tong assembly in which a pipe engaging jaw carrying ring is supported on a frame structure for relative angular movement, the frame structure having a cam ridge engageable by cam followers on the jaws, whereby the jaws will be actuated positively between a pipe engaging position and a retracted position in response to rotation of said jaw carrying ring in either direction, an actuator cylinder being selectively connectable to the jaw carrying ring at angularly spaced locations so as to effect movement of said jaws between said positions to cause said jaws to grip a pipe joint part to hold the same against rotation in either direction, whereby to enable the rotation of the other joint part in either direction to either make up or break out pipe joints.

Further, the invention provides a tong assembly, as aforesaid, wherein latch means are provided for connecting the actuator cylinder to the spaced angular locations on the jaw carrying ring, said latch means being automatically released upon actuation of means for shifting the actuator cylinder between the angularly spaced locations, so that the changing of the direction of actuation of the jaw carrying ring may be effected from a remote location.

In addition, the invention provides a pipe tong assembly in which an inner, pipe engaging jaw carrying ring is supported concentrically with respect to an outer power driven ring providing a cam ridge engageable by cam followers on the jaws, whereby the jaws will be actuated positively between a pipe engaging position and a retracted position in response to rotation of the outer power driven ring in either direction, whereby to effect engagement of the jaws with a pipe joint part to drive the same rotatably in either direction while the other joint part is held against rotation by a back-up tong, for example, having pipe engaging mechanism in accordance with the invention.

In accomplishing the foregoing, cooperative stop means are provided for selectively limiting jaw retracting relative rotation of the jaw carrying ring and the outer power driven ring to positions at which the jaws are fully retracted.

Other objects and advantages of the invention will be hereinafter described or will become apparent to those skilled in the art, and the novel features of the invention will be defined in the appended claims.

BRIEF DESCRIPTION OF THE DRAWINGS

FIG. 1 is a top plan view showing a power tong and back-up tong assembly supported over a well bore;

FIG. 2 is a view in side elevation of the structure of FIG. 1;

FIG. 3 is an enlarged view, partly in top plan, with parts broken away, as taken on the line 3—3 of FIG. 2;

FIG. 4 is a fragmentary view in bottom plan showing the tong head of the invention;

FIG. 5 is an enlarged view, partly in top plan and partly in horizontal section, showing the tong head of the invention;

FIG. 6 is a vertical sectional view, as taken on the line 6—6 of FIG. 5;

FIG. 7 is a fragmentary view in vertical section, as taken on the ine 7—7 of FIG. 5;

FIG. 8 is a fragmentary view in horizontal section, as taken on the line 8—8 of FIG. 6;

FIG. 9 is a fragmentary detail view in vertical section, as taken on the line 9—9 of FIG. 5;

FIG. 10 is a fragmentary view in vertical section on an enlarged scale, as taken on the line 10—10 of FIG. 5;

FIG. 11 is a schematic view illustrating the control system for effecting selective actuation of the jaw carrying ring.

FIG. 12 is an enlarged fragmentary view showing the power tong head partly in top plan, parts being broken away to expose the interior of the head;

FIG. 13 is a view in vertical section, as taken on the line 13—13 of FIG. 12;

DESCRIPTION OF THE PREFERRED EMBODIMENT

Figure 14:
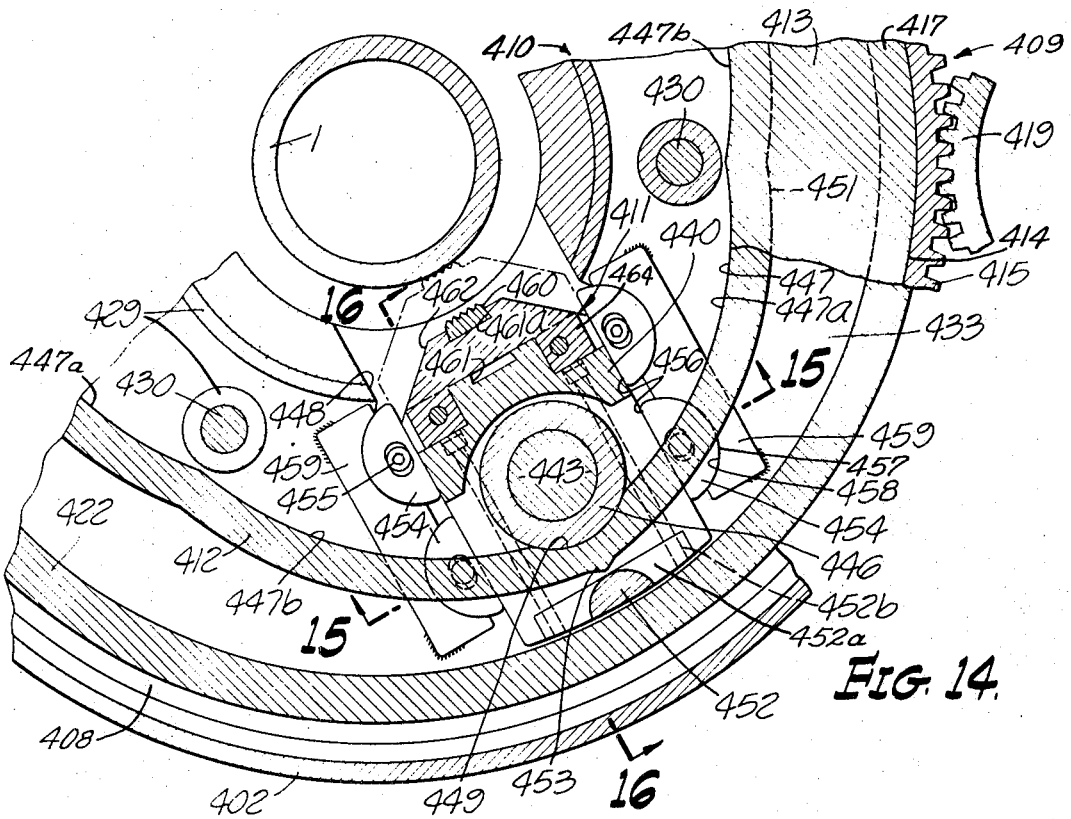
FIG. 14 is a fragmentary detail view, partly in horizontal section, illustrating the relationship of the pipe engaging jaws to the cam of the outer ring.

Referring first to FIGS. 1 and 2, there is generally illustrated a tong assembly T adapted to be supported above the floor F of a drilling platform which may be part of the usual drilling rig mounted above a well bore and into which pipe, such as drill pipe or casing, is adapted to be run and from which such pipe will be sometimes pulled, as in the case of drill pipe. Such a pipe is illustrated in FIGS. 1 and 2 as including an upper stand of pipe P1 in the illustrative form of a stand of drill pipe having a tool joint pin end 1 thereon adapted to be threadedly connected by the tong T to the box end 2 of a length or stand of the pipe P2 disposed in the well bore. In order to support the tong assembly T in an operative position above the well bore so that the stand of pipe P1 may be lowered therethrough for engagement with the pipe P2, a suitable crane C is provided, including a boom 3 projecting from a vertically disposed post 4. A cable 5 extends over sheaves 6, 6 and is connected to a pressure operated cylinder mechanism 7 disposed within the post 4, whereby the tong assembly T may be raised and lowered relative to the post 4 and thereby relative to the well bore into which or from which pipe is being removed. Also forming a part of the crane C is a rabbit 8 slidable vertically along the post 4, there being a second cable 9 also connected to the upper end of cylinder 7, extending over a sheave 10, and connected also to the rabbit 8 so that the mass of the tong assembly T may be properly supported. This crane assembly may be of any desired type, but is preferably constructed as herein shown and in accordance with the disclosure in the application for United States Letters Patent filed Dec. 4, 1967 entitled Power Tong Crane, Ser. No. 687,812, now U.S. Pat. No. 3,505,913.

The tong assembly T, as is typical of tongs of the type here involved, includes a head section generally denoted at 11 and a supporting and power transmission section generally denoted at 12. The latter section in the illustrative embodiment has a hydraulic motor 13 adapted to be connected to a suitable source of motive fluid under pressure so as to drive the transmission mechanism of the tong assembly, which may be of any desired type, but which may preferably be constructed in accordance with the disclosure in the application for United States Letters Patent filed Dec. 4, 1967 entitled Power Pipe Tong Transmission Assembly, Ser. No. 687,815, now U.S. Pat. No. 3,516,308.

Head section 11 of the tong assembly T is, as will be later described, constructed so as to be operated by the hydraulic motor 13 so as to grip and effect rotation of the pin end 1 of the pipe P1 while the box end 2 of the pipe P2 is held against rotation, either in the usual rotary table slips or by the back-up tong assembly generally denoted at B, which will now be described.

The back-up tong assembly B, as best illustrated in FIGS. 2 and 3, includes a support structure 201 comprising an elongated hollow case 202 supported at its rear end 203 by a post 204 depending from the power tong assembly T. If desired, as will be appreciated by those skilled in the art, the post 204 may extend through a chamber 205 so as to be engaged by a pressure foot 206 of a force sensing hydraulic device 207 having a conduit 208 leading to a gauge (not shown) which will show the angular force applied to the back-up tong B tending to cause angular movement of the support structure 201, as an indication of the make up torque applied to pipe joints held by the back-up tong, as will hereinafter be described, and rotated by the power tong assembly T.

At the forward end of the support structure 201 is a back-up tong head assembly generally denoted at 209, the support structure 201 including brackets 210 connected to ears 211 formed as part of the head assembly 209 by bolts 212. This head end of the back-up tong assembly is also, in the illustrative embodiment, supported beneath the power tong assembly T by means of ears 213 projecting from the sides of the tong assembly T and supporting bolts 214 which extend through outwardly extended gussets 215 carried by the support structure 201, coiled springs 216 being provided between the gussets 215 and the ears 213 to cushion relative vertical movement between the head 11 of the power tong assembly T and the head 209 of the back-up tong assembly B.

The tong head assembly 209, as best seen in FIGS. 6–9 includes a member 217 which is in the form of a plate having an external marginal reinforcing flange 218 and an internal marginal flange 219, the ears 211 previously described, by which the tong head 209 is carried at the head end of the support structure 201, being provided on the outer peripheral flange 218 of the plate member 217, so that the latter constitutes what will be characterized herein as a stationary ring. This stationary ring 217 supports a relatively rotatable ring assembly generally denoted at 220. The ring assembly 220 comprises an upper plate 221 and a lower plate 222 of generally triangular form, but truncated at the apices so as to generally conform to the circular form of the stationary plate 217. At a suitable number of angularly spaced locations the plates 221 and 222 are provided with opposing internal bosses 223 and 224 through which extend connecting bolts 225, and, at such locations, each of these plates may be further provided with axially extended arcuate flanges 226 and 227 which define therebetween radially opening windows 228 (see FIGS. 5 and 8).

The pipe-gripping means comprise a plurality of jaws generally denoted at 230 which are adapted to be shifted through the windows 228 between retracted positions and inwardly projected positions at which the jaws 230 will engage a pipe joint part, such as the joint part 2 of the pipe P2. These jaws 230 each comprise a generally U-shaped body having an inner vertical wall 231 and upper and lower walls 232 and 233, respectively, these latter walls extending radially into overlying and underlying relation to the stationary plate 217. The end wall 231 of each of the jaws 230 is, as best seen in FIG. 7, provided with recesses 234 and 235, respectively adapted to receive complemental ears 236 and 237 which project outwardly from the upper and lower ends of a die carrier 238, the latter having a vertically disposed slot 239 adapted to receive a pipe engaging tong die 240 of suitable construction, the tong dies respectively being held in the slots 239 by fasteners 241. It will also be noted that the end walls 231 of the jaws 230 are also provided with tong die slots 242 adapted to receive dies similar to the dies 240, but that die carriers 238 of different radial projection may be associated with the respective jaws 230 so as to enable the jaws to effectively engage pipe or pipe joints over a wide range of sizes, the illustrative die carrier 238 being adapted to engage an intermediate range of pipe sizes, while larger pipe sizes would be engaged by dies in the jaw slots 242, and the carriers 238 would be removed. In order to releasably secure the die carriers 238 on the end walls 231 of the jaws 230, the ears 237 of the die carriers are provided with openings adapted to accommodate locking screws 243, as seen in FIG. 7.

When the jaws 230 are fully retracted, it will be noted that the end walls 231 thereof would be beneath the inner periphery 244 of the top plate 221 and the inner periphery 245 of the bottom plate 222 of the rotatable ring assembly 220, but when a die carrier, such as the die carrier 238, is provided on the jaws 230 the die carriers will project radially inwardly relative to the peripheries 244 and 245 of plates 221 and 222, respectively. Thus, guide means are provided within the inner peripheries of the plates 221 and 222, including an annular body 246 having windows 247 adapted to register with the windows 228 provided between the inner walls provided by the annular flanges 226 and 227 of the plates 221 and 222. The guide body 246 has an inner periphery which projects inwardly beyond the dies 240 in die carriers 238 so as to prevent engagement thereof by a pipe joint or pipe end. Beneath the guide body 246 is an outwardly extended flange 248 adapted to be secured by fasteners 249 to the bottom plate 222 of the rotatable ring assembly 220. In order to substitute or remove the die carriers 238 from the jaws 230, as best illustrated in FIG. 4, the guide fasteners 249 must be removed to allow slight angular movement of the guide 248 relative to the ring assembly 220, whereby to expose in guide flange notches 250 the locking screws 243 which secure the die carriers 238 to the jaw walls 231, but when the guide is in fastened position, the flange 248 at least partially overlies holes 243a in the bottom plate 222 of the ring assembly 220 which are aligned with the fasteners locking screws 243 so as to preclude loss of these screws from the assembly 220 during use.

Means are provided for effecting the radial retraction and projection of the jaws 230 to pipe engaging positions. Such means includes a cam ridge 251 formed as at least the lower portion of the inner marginal flange 219 of the stationary plate 217, and a roller 252 engaged with one side of the ridge 251, as well as a roller 253 engaged with the other side of the ridge 251. The roller 252, in the illustrative embodiment, is a large roller disposed between the upper and lower walls 232 and 233 of the jaws 230 and rotatably supported on a shaft 254 extending between the latter walls. The roller 253 in each jaw is a smaller roller journalled on a stud 255 extending upwardly through the lower wall 233 of the jaw 230. As best seen in FIG. 5, the cam ridge 251 is a continuous ridge having three similar segments, each cooperative with the rollers 252 and 253 to effect movement of the respective jaws between the aforementioned retracted and inwardly projected positions. Each segment of the cam ridge 251 includes a central depression 251a and a pair of similar arcuately extended camming walls 251b and 251c extending arcuately from the central depression 251a. These walls 251b and 251c respectively merge with the walls 251c and 251b of the adjacent cam ridge segments at points designated 251d. In radial alignment with the central depressions 251a, each of the cam ridge segments is provided with an outwardly extended protuberance 251e, so that, as will be more fully understood hereinafter, the terminal stages of movement of the jaw carrying ring assembly 220 in a direction to cause retraction of the jaws will cause the rollers 252 to be seated in the central depressions 251a between the respective camming surfaces or walls 251b and 251c. In this connection, it will now be apparent that angular movement of the ring assembly 220 in either direction when the jaws 230 are in the positions shown in FIG. 5 will result in said jaws being cammed by the action of the rollers 252 on either cam wall 251b or cam wall 251c of the respective camming ridge segments inwardly toward a pipe located within the central opening of the tong head defined by the guide body 246. It will also be appreciated that reversal of the direction of angular movement of the jaw carrying ring 220 will effect retraction of the jaws 230 by the action of the rollers 253 on the outer walls of the respective camming ridge segments.

Inasmuch as the jaws 230 will project more or less inwardly into the tong head opening, depending upon the size of the pipe joint disposed therein, guide means are provided for the respective jaws, which guide means are adapted to cock slightly so as to maintain full facial contact with the jaws when torque applied to the pipe tends to cause cocking of the jaws within the guide means for the jaws. This guide means comprises, in association with each of the jaws 230, upper and lower guide pads 256 and 257, respectively, disposed in pad supports 258 and 259, a pivot pin 260 pivotally mounting the respective pads 256 and a pivot pin 261 pivotally mounting the respective pads 257 in their supports 258 and 259 for slight angular movement, these pads 256 and 257 slidably engage the jaws 230 along their side walls and each of the pads 256 and 257 may adjust angularly so as to maintain facial contact with the jaws as the latter are caused to cock slightly angularly in response to engagement with the pipe when the latter is subjected to angular forces.

Actuator means generally denoted at 265 are provided for effecting angular movement of the jaw carrying ring assembly 220, as aforesaid, in opposite jaw closing directions, from the fully retracted jaw positions, as well as for effecting angular movement of the ring assembly 220 in opposite jaw retracting directions. This actuator means 265 includes a fluid pressure operated actuator cylinder 266 which is pivoted centrally of the support structure 201 and in rearwardly spaced relation to the head 209 on a pivot pin 267 supported in a bracket 268, as seen in FIGS. 3 and 11. Projecting from the actuator cylinder 266 is an actuator rod 269 adapted to be connected to the ring assembly 220 at one location at one side of a center line extending from pivot pin 267 through the center of the tong head in order to force the ring assembly 220 in one angular jaw closing direction, and, alternately, to be connected to the ring assembly 220 at the other side of said center line to cause angular movement of the ring assembly 220 in the other angular jaw closing direction, retraction of the rod causing reverse jaw opening angular movements of the ring assembly 220. As best seen in FIGS. 5 and 10, the rod 269 is connected to a block 270. This block 270 has a head 271 which is disposed between a pair of plates 272 and 273. Plate 272 is formed as part of, or connected to, a mounting bracket 274 which is secured as by fasteners 275 to an upwardly extending reinforcing side wall 276 extending along the margin of the lower plate 222 of the ring assembly 220. The plate 273 likewise is formed as part of, or connected to, a mounting bracket 277 which is secured as by fasteners 278 to the just-mentioned side wall 276. Plate 272 has an elongated arcuate slot 279, and plate 273 has a correspondingly elongated arcuate slot 280, in which vertical extensions of the head 271 of block 270 are disposed. The opposite ends of the slots 279 and 280, as indicated at 281 and 282 in FIG. 5, constitute abutments engageable by the head 271 to limit movement of said head relative to the plates 272 and 273. Means are provided for shifting the head 271 between the limits provided by the slot ends 281 and 282, including a fluid pressure operated actuator cylinder 283 pivotally supported at one end on a bracket 284, the cylinder 283 having a rod 285 connected by a pin-and-slot lost motion connection 286 to a lever arm 287 projecting from the pivoted end of the ring actuator cylinder 266. Accordingly, when rod 285 is retracted into cylinder 283, the actuator cylinder 266 will be caused to swing about its pivot 267 from the position shown in FIGS. 3 and 11, at which the head 271 is engaged with the abutment 282, to the other end of the slots 279, 280 into engagement with the abutment 281. Conversely, when the actuator rod 285 is projected from the cylinder 283, opposite pivotal movement of the ring actuator cylinder 266 will occur. Thus, the actuator cylinder 283 and its rod 285 constitute means for shifting the ring actuator cylinder 266 to the above-mentioned opposite sides of the center line extending between pivot pin 267 and the center of the tong head 209. In addition, the lost motion connection 286 constitutes means enabling the ring actuator cylinder 266 to operate to move the ring assembly 220 in either direction without interference from the connection of the rod 285 to the lever arm 287, by which actuator cylinder 266 is caused to pivot between its two operative positions.

Means are provided for releasably latching the head 271 in its respective extreme positions. Accordingly, the head 271, as seen in FIG. 10, is provided with a bore 288 in which is disposed a latch pin 289, the upper end of which is adapted to extend into a pin opening 290 provided in a plate 291 mounted on the slotted plate 272 adjacent the abutment 281, when the head 271 is in that position. Adjacent the abutment 282 the latch pin 289 is adaptde to engage in a pin opening 292 in a plate 293 carried by the slotted plate 272. Means are provided for retracting the pin 289 from the pin openings 290 and 292 and, in the illustrative embodiment, the pin 289 is provided with a piston portion 294 disposed in the bore 288; and the block 270 is provided with a fluid passage 295 leading from a fluid conduit connector 296, whereby fluid under pressure may be admitted to the bore 288 above the piston 294 to force the pin 289 downwardly against the force of a spring 297 which normally biases the pin 289 into latching engagement with either of the plates 291 or 293 when the head 271 is in either of the positions adjacent abutments 281 or 282.

Preferably, means are provided which may be controlled from a remote location, so that the latch pin 289 will be retracted when it is desired to actuate the actuator cylinder 283 to shift the ring actuator cylinder 266 between its two operative positions. Accordingly, as seen in FIG. 11, a control system is provided for supplying pressure to the pin retracting piston 294 when pressure is supplied to the actuator cylinder 283 at either end of the latter.

Referring to FIG. 11, such a system is illustrated diagrammatically as including a conduit 300 leading from a source of fluid pressure at a remote location to a 4-way valve 301. This 4-way valve may be suitably actuated as from a source of control fluid pressure to allow the flow of hydraulic fluid to the latch from chamber 288 through a conduit 302 having therein a back flow preventing valve 303, another conduit 304 also leading from the 4-way valve 301 to the pin retracting chamber 288 and having a back flow preventing valve 305 therein. A conduit 306 interconnects the conduit 302 to one end of the actuator cylinder 283, and a conduit 307 interconnects the conduit 304 to the other end of the actuator cylinder 283, so that, under the control of the 4-way valve 301, the actuating fluid pressure source conduit 300 may be selectively and simultaneously connected to one or the other ends of the actuating cylinder 283 and to the latch pin retracting chamber 288. Normally, the latch pin chamber 288 communicates with an exhaust passage 308 provided in the head 271 of block 270, and this passage 308 communicates via a conduit 309 with a normally open exhaust valve 310. Accordingly, it is desired that when the latch pin 289 is to be retracted the exhaust valve 310 be closed. For this purpose there is illustrated a conduit 311 connected to the conduit 302 and leading to the exhaust valve 310, and another conduit 312 is connected to the conduit 304 and leads to the exhaust valve 310, so that, upon the application of pressure to the latch pin chamber 288 through either of the conduits 302 or 304, the exhaust valve 310 is automatically closed; but when latch pin retracting pressure is relieved from conduits 302 or 304, the exhaust valve 310 will again automatically open so as to allow a latch pin engaging spring 297 to force the latch pin to a latched position.

Also illustrated in FIG. 11 is a 4-way valve 313 adapted to effect opposite working of the double acting cylinder 266, whereby the ring assembly 220 is caused to be actuated in jaw closing and jaw opening directions. Leading into the valve 313 from a suitable remote source of fluid pressure is a conduit 314, and conduits respectively designated 315 and 316 are selectively adapted to communicate with the source conduit 314 to cause operation of the cylinder 266 in opposite directions, the other conduit 315 or 316 being connected to an exhaust conduit 317 leading back to the supply tank.

Referring now to FIGS. 12 through 18, the details of a power driven pipe gripping mechanism of the head section 11 of the power tong assembly T will now be described.

The power tong assembly head section 11 comprises a suitable housing or case 400 including an upper case section 401 and a lower case section 402 joined together at a horizontal parting line as by a suitable number of fasteners 403. The case 400 is open at one side for connection to the case 404 of the power tong transmission 405, by which the tong head 11 is adapted to be driven in response to operation of the above-mentioned motor 13. Suitable fastenings 406 are employed to connect the upper tong head case section 401 to the transmission case 404, and suitable fastenings 407 are employed for connecting the lower tong head case section 402 to the transmission case 404. The case 400 essentially provides an annular channel 408 in which is revolvably disposed an outer ring assembly generally denoted at 409. Concentrically within the outer ring assembly 409 is an inner ring assembly generally denoted at 410 which supports for radial movement a plurality of circumferentially spaced pipe gripping jaws generally denoted at 411, a cam ridge 412 formed as a part of the outer ring asembly 409, in this embodiment being employed to effect radial movement of the jaws 411 into and out of engagement with the tool joint 1 of the pipe P1 during the making up and breaking out of pipe joints comprising the tool joint 1 in response to relative angular movement in opposite directions between the outer ring 409 and the inner ring 410, as will hereinafter more fully appear.

The outer ring assembly 409 in the illustrative embodiment includes a ring-like body 413, to the outer peripheral wall 414 of which is affixed a ring gear 415. This ring gear 415 has an upper flange 416 which overlies an annular flange 417 on the outer ring body 413 and which is secured thereto as by suitable fastenings 418. Means are provided for driving the ring gear 415 including the output or driven gear 419 of the transmission assembly 405, the output gear 419 being in mesh with the ring gear 415, as best seen in FIG. 12. The outer ring assembly 409 also includes a bottom plate 420 secured at its outer periphery as by fasteners 421 to an annular flange 422 which depends from the outer ring body 413, this plate 420 extending inwardly from the open channel 408 of the case 400 and having a seal ring engaging flange 423 supported therebeneath and engaged by a seal 424 seated in an end flange 425 of the lower case section 402.

Means are provided for revolvably supporting the outer ring assembly 409 in the case 400. In the illustrative embodiment such means includes upper bearing race and ball bearing means 426 interposed between the upper outer ring flange 416 and the case section 401 and lower bearing race and ball bearing means 427 interposed between the lower outer ring flange 420 and the case section 402.

The inner ring assembly 410 comprises an upper ring body section 428 and a lower ring body section 429 joined together by pins 430 having nuts 431 threaded thereon so as to clamp the inner ring sections 428 and 429 together. The upper inner ring section 428 includes an outwardly extended flange section 432, and the lower inner ring section 429 includes an outwardly extended flange section 433 defining therebetween an annular space in which the outer ring body 413 is disposed.

Means are provided for supporting the inner ring assembly 410 for angular movement with respect to the outer ring assembly 409, and, in order to reduce drag friction, such means may conveniently comprise a suitable number of roller assemblies generally denoted at 434 carried beneath the inner ring upper flange 432 and engaged with the top surface 435 of the outer ring body 413. These roller assemblies 434 may be suitably angularly spaced about the tong head assembly, as seen in FIG. 12, between the jaws 411.

In order to provide a top seal corresponding to the seal provided by the seal ring 424 between the outer ring assembly 409 and the case section 402, an upper seal ring 436 is provided at the inner periphery 437 of the upper case section 401, and an annular flange 438 secured to the upper inner ring section 428, as by fasteners 439, is provided for sealing engagements with the upper seal ring 436.

Figure 15:
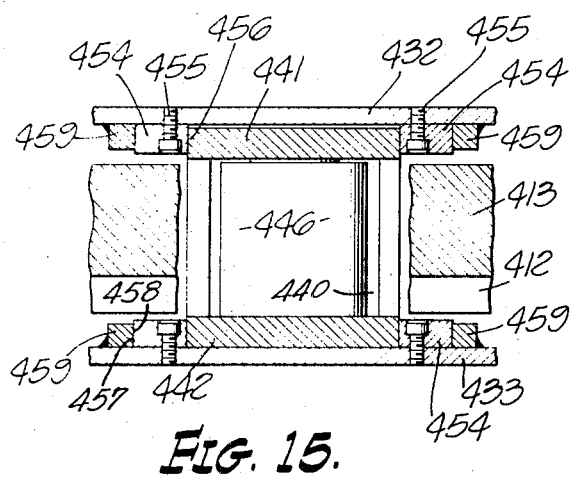
FIG. 15 is a view in vertical section, as taken on the line 15—15 of FIG. 14.
Figure 16:
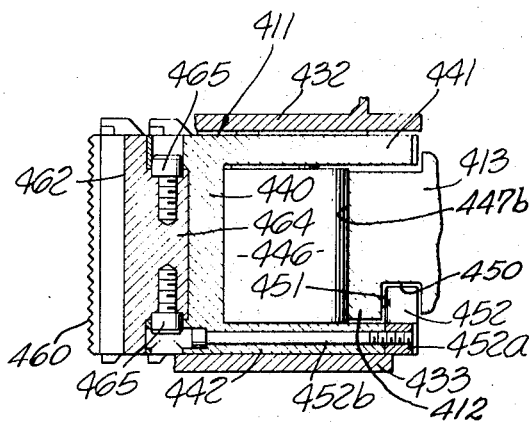
FIG. 16 is a view in vertical section, as taken on the line 16—16 of FIG. 14.

Each of the jaws 411, as best seen in FIGS. 13, 15 and 16, comprises a channel-shaped body composed of an inner end wall 440 and upper and lower walls 441 and 442, respectively. A bearing supporting shaft 443 extends between the top and bottom walls 441 and 442 of the respective jaws 411 and supports for rotation thereon a bearing sleeve 446 which is engageable by the inner peripheral surface 447 of the outer ring body 413.

Referring to FIG. 14, it will be seen that the jaws 411 are respectively disposed in windows 448 provided in the inner ring assembly 410, whereby the jaws 411 are adapted to be moved radially with respect to the center of the assembly. The inner peripheral surface 447 of the outer ring body 413 provides a cam surface engageable with the bearing sleeves 446 of the jaws 411 for effecting radial inward movement of the jaws 411 from fully retracted positions, at which the bearing sleeves 446 are disposed in depressions 440 in the cam surface 447, to positions for engaging and gripping the tool joint 1 of the pipe P1. Spaced radially outwardly from the cam surface 447 of the outer ring body 413, the bottom wall of the ring body 413 is provided with a downwardly opening channel 450 having a side wall 451 which, except at the depressions 449, is substantially parallel to the cam surface 447; and the respective jaws are each provided with a lug 452 projecting outwardly from the bottom wall 442 of the jaw and upwardly into the channel 450 so as to slidably engage with the surface 451, whereby the jaws 411 each adapted to be positively retracted from a pipe gripping position to a fully retracted position. As shown in FIG. 14, the surface 451 includes an outward projection 453 engageable with the lug 452 of the jaws to effect positive movement of the bearing sleeves 446 into the depressions 449 of the cam surface 447.

Means are provided for slidably supporting the jaws 411 for radial movement with respect to the tong head assembly, and such means, as best seen in FIGS. 12, 13 and 15 may comprise suitable guide elements 454 each mounted on pivot pins or fasteners 455 for slight rocking motion. Each of the guide elements 454 has a flat surface 456 slidably engageable with the respective top and bottom walls 441 and 442 of the jaws 411 and an arcuate surface 457 slidably engaging in an arcuate seat 458 in a supporting block 459, various supporting blocks 459 respectively being welded or otherwise suitably fastened to the top and bottom walls 432 and 433 of the inner ring assembly 410.

Referring to FIG. 16, it will be noted that the lug 452 of the respective jawls 411, which is engageable with the cam surface 451 to effect retraction of the jaws, is removably attached to the bottom wall 442 of the respective jaws. The lug 452 is provided on a supporting base section 452a which is secured to the jaw wall 442 as by bolts 452b which extend through the inner end wall 440 of the jaw so as to be accessible within the pipe opening in the tong head assembly, thus the jaw retracting lugs 452 may be disconnected from the jaws 411 so that the jaws may be removed from the tong assembly through the windows 448, thereby obviating the necessity of disassembling the case 400 and the inner and outer ring assemblies in order to effect removal of the jaws 411 for service or repair.

Each of the jaws 411, furthermore, is adapted to be provided with pipe engaging and gripping dies 460. Such dies characteristically are adapted to be removably received in dovetailed slots in the jaws of tongs, and, accordingly, the inner wall 440 of each of the jaws 411 is provided with such a dovetailed groove, as at 461. In order that the tong assembly may be capable of effective utility over a wide range of pipe sizes, the jaws 411 may be provided with auxiliary die carriers 462 projecting radially inwardly and being provided with a groove 461a adapted to receive the tong die 460. In the illustrative embodiment, the die carriers 462, at their opposite sides, are provided with ears 464 adapted to be received in companion slots in the jaws 411 and to be secured in place as by fasteners 465.

In order to effect relative angular movement between the cam surface 447 and the bearing sleeves 446 of the respective jaws, whereby to effect opposite radial movement of the jaws 411, it is necessary that the inner ring assembly 410 remain relatively stationary during rotative movement of the outer ring assembly 409. Accordingly, brake means, including a brake band 470 having friction lining 471 thereon, is disposed about a cylindrical wall 472 provided about the upper inner ring section 428. In order to maintain effective engagement of the brake means with the cylindrical surface 472, the brake band 470 may be of resilient material, such as brass, having an inherent inside diameter less than the diameter of the wall 472 so that the friction lining material 471 is maintained in frictional coengagement with the wall 472. Referring to FIGS. 12 and 13, the brake band 470 is seen to include anchors 473 and 474 at its opposite ends comprising U-shaped members providing abutments engageable with anchor pins 475 and 476 which project downwardly from a supporting plate 477 which is in turn threadedly connected as by fasteners 478 to the upper case section 401. Right-hand rotation of the inner ring assembly 410 will cause anchoring of the anchor 473 on pin 475, and, conversely, left-hand rotation of the inner ring assembly 410 will cause anchoring engagement of anchor 474 on pin 476, so that the brake means is self-energizing in either direction.

It will now be apparent that operation of the transmission means 405 to effect rotation of the ring gear 415 in a right-hand direction will effect angular movement of the outer ring assembly 409, thereby moving a section 447a of the cam surface 447 relative to the bearing sleeve 446 carried by each of the jaws 411 so as to effect inward movement of the jaws, the brake band 470 holding the inner ring assembly 410 against rotation along with the outer ring assembly 409 until the pipe gripping dies 460 engage the tool joint 1 of the pipe P1, at which time the inner and outer rings 410 and 409, respectively, will rotate as a unit to effect right-hand rotation of the pipe P1.

On the other hand, if left-hand rotation is imparted to the ring gear 415 when the jaws 411 are fully retracted, the inner ring assembly 410 will be held stationary by the brake band 470 and a section 447b of the cam surface 447 will effect inward movement of the jaws 411, as the inner ring assembly 410 remains stationary, until the pipe gripping dies 460 engage the pipe P1.

When the jaws 411 are in the projected or pipe engaging positions, whether as a result of right-hand or left-hand rotation of the outer ring assembly 409 relative to the inner ring assembly 410, the jaws 411 will be retracted when the outer ring assembly is rotated in the other direction.

Reverse stop means are provided to prevent continued relative rotation between the outer ring assembly 409 and the inner ring assembly 410 following retraction of the jaws 411, whereby to prevent reclosure of the jaws 411. Such reverse stop means is generally denoted at 480 in FIGS. 12 and 17 and includes a first stop member 481 carried by the outer ring assembly 409 and a second stop member 482 carried by the inner ring assembly 410 and alternately positionable to prevent relative rotation of the outer ring and inner ring in opposite directions when the jaws 411 are being retracted, beyond a point at which the bearing sleeves 446 are disposed in the cam surface depressions 449. The stop member 481 comprises an elongated body having a dovetail connection as at 483 with the upper flange 416 of the outer ring assembly 409, the body 481 being secured in place as by a fastener 484. At one end the stop member 481 has an arcuate stop surface 485 and at its other end the stop member 481 has an arcuate stop surface 486 respectively operable to engage the alternately positionable stop member 482 to prevent further rotation of the outer ring relative to the inner ring upon opening of the jaws 411 during the making up of pipe joints and during the breaking out of pipe joints. In FIG. 12 the alternately positionable stop member 482 is in a position for stopping relative rotation of the inner and outer rings upon opening of the jaws 411 during the use of the tong for making up pipe joints.

Figure 17:
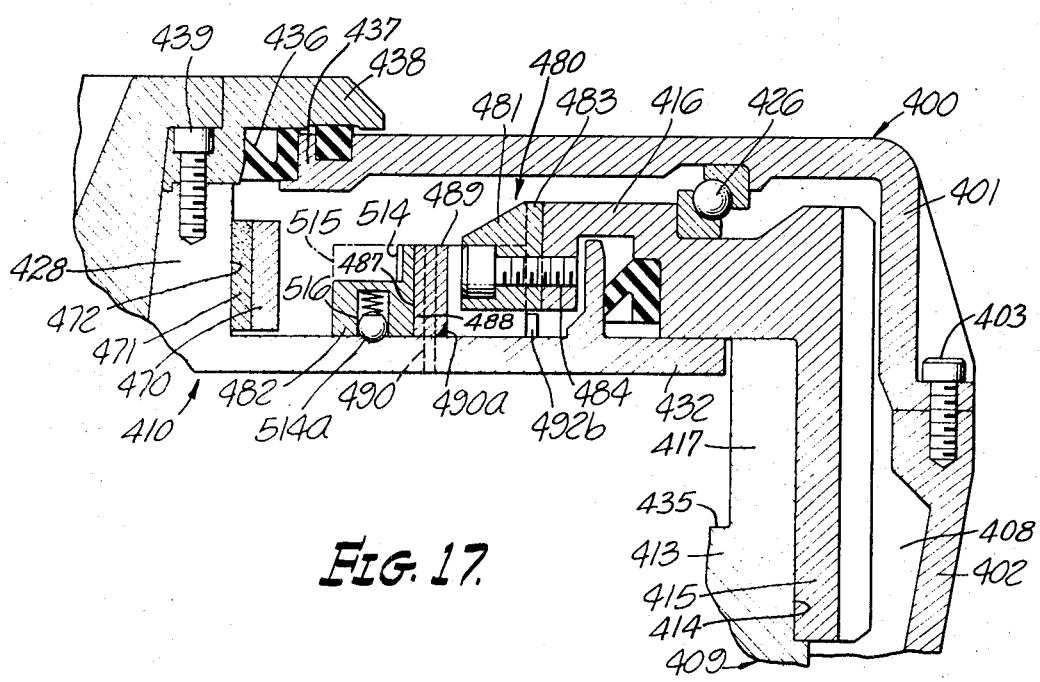
FIG. 17 is a detail view in vertical section on an enlarged scale, as taken on the line 17—17 of FIG. 12.

This alternately positionable stop member 482 is of arcuate form having an inner arcuate surface 487 piloted upon an outer arcuate surface 488 of a guide block 489 which is suitably attached to the upper wall 432 of the upper inner ring section 428 as by roll pins 490 and welding at 490a (FIG. 17). The stop member 482 is shiftably supported on the outer flange 423 of the inner ring section 428 by a pair of retainers 491 which overlie an edge flange 492 of the stop member 482 so as to allow the member 482 to move angularly about the guide block 489 between the position shown in FIG. 12, at which the end 494 of the member 482 is disposed in the path of the stop member 481, and an alternate position at which the other end 493 of the member 482 will be disposed in the path of the stop member 481, this alternate position being illustrated in FIG. 18. In these alternate positions the stop member 481 is free to pass one of the ends of the stop member 482 so as to abut with the other end of the stop member 482. When, as seen in FIG. 12, the stop member 481 is engaged with the end 494 of the stop member 482 the latter is rigidly backed up by its retainer 491. In addition, the end 493 of the stop member 482 is provided with an end flange 492a and the end 494 of the stop member 482 is provided with an end flange 492b, these end flanges essentially being continuations of the edge flanges 492 and being adapted, when the stop member 482 is in either of its extreme positions, to underlie the inner periphery of the top flange 416 of the outer ring assembly 409, whereby to further reinforce the mounting of the stop member 482 on the top wall 432 of the inner ring assembly 410.

As seen in FIG. 12, means comprising a pair of angularly spaced stop projections 495 and 496, suitably affixed as by welding to the upper wall 432 of the inner ring assembly 410, are provided for limiting relative angular movement between the inner ring assembly 410 and the outer ring assembly 409 to an extent in excess of the angular movement required to effect the full projection of the jaws 411. Thus, when the outer ring assembly 409 is driven and no pipe joint is present between the jaws to limit their inward movement, the reverse stop member 481 is prevented from moving away from the reverse stop member 482 beyond a location at which the end surface 485 of the stop member 481 abuts with the stop lug 495 or the end surface 486 of the stop member 481 abuts with the stop lug 496. Such limited angular movement between the inner and outer ring assemblies 410 and 409, respectively, has two advantages, the first being that the outer ring assembly 409 will be prevented from rotating relative to the inner ring assembly 410 to such an extent that the stop member 481 can engage the wrong side of the stop member 482, and the second advantage being that during the opening of the jaws 411, when no pipe joint is present between the jaws to prevent inward movement of the jaws, it is not possible for the outer ring assembly 409 to accelerate to such an extent as to apply damaging shock loads on the stop member 482 upon engagement therewith by the stop member 481.

Figure 18:
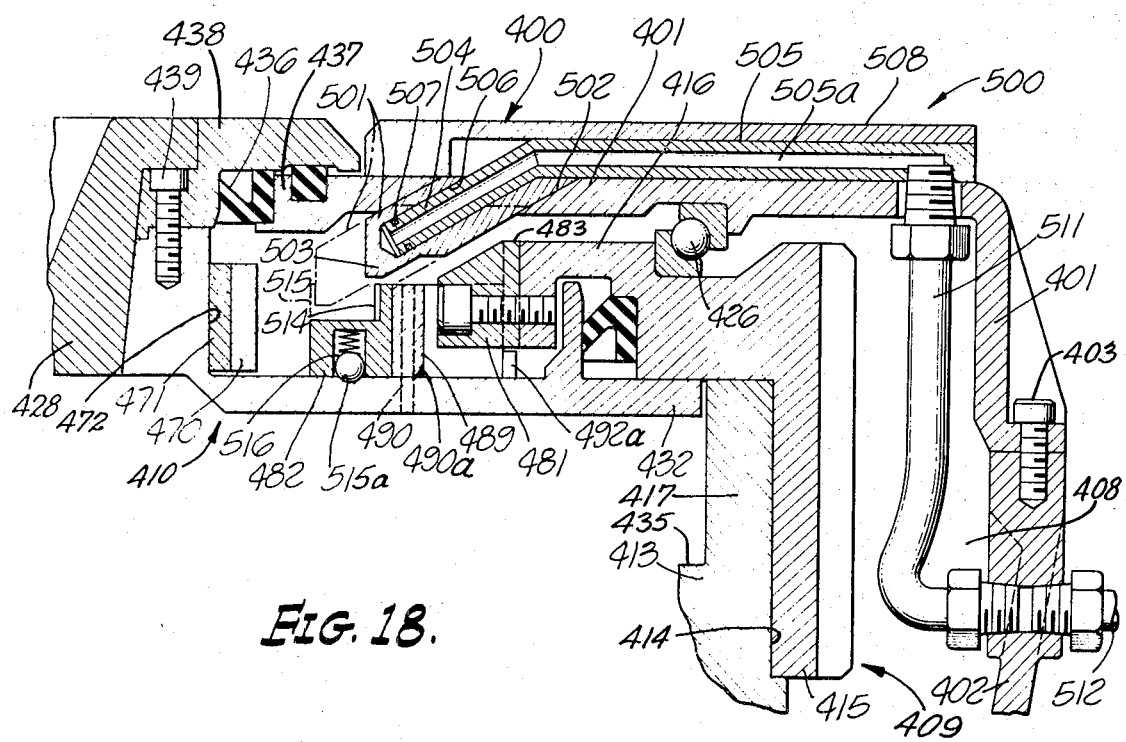
FIG. 18 is a detail view in vertical section on an enlarged scale, as taken on the line 18—18 of FIG. 12.

Abutment means are provided for effecting angular movement of the alternately positionable stop member 482 for cooperative engagement with the stop member 481 in the reverse mode of operation of the tong assembly, such abutment means being generally denoted at 500 and being seen in FIGS. 12 and 18. This abutment means includes a block 501 extending at an angle through a rectangular opening 502 in the upper case section 401 of the case 400 and having at its inner end a downwardly extended projection 503. The block 501 is reciprocably disposed on an angularly disposed cylindrical end section 504 of a fluid conductor member 505, the end 504 of the conductor member 505 extending into a bore 506 in the block 501 and having a suitable seal ring 507 thereon sealingly engaged in the bore 506. The conductor member 505 extends externally of the case section 401 and is covered by a protective plate 508 which is suitably affixed to the top case section 401 of the case 400, as seen in FIG. 12, and the conductor member 505 has a fluid passage 505a therein for conducting fluid under pressure to the bore 506 of the abutment member 501 to effect outward movement of the abutment member on the end 504 of the fluid conductor member 505. Resilient means are provided for effecting return movement of the abutment member 501 when fluid pressure is relieved, such resilient means in the illustrative embodiment including a pair of coiled tension springs 509 connected at their ends to pins 510 respectively carried by the abutment member 501 and the conductor member 505, as best seen in FIG. 12.

Suitable means are provided for admitting fluid under pressure to the passage 505a of the fluid conductor member 505 and exhausting fluid from the passage 505a. In the illustrative embodiment a conduit 511 is disposed within the case 400 at the outside of the ring gear 415 and has connection with a fluid conduit 512 leading into the case 400 from a suitable external source of fluid under pressure (not shown). Preferably, air is employed as the pressure fluid for effecting projection of the abutment member 501 from the position shown in full lines in FIG. 18 to the position shown in broken lines.

When the end projection 503 of the abutment member 501 is in its broken line position in FIG. 18, and the outer ring assembly 409 is rotating in either direction within the case 400, the end projection 503 is disposed in the path of the alternately positionable stop member 482 for abutting engagement with the latter so as to shift the same between its alternate positions, depending upon the direction of rotation of the outer ring assembly.

Accordingly, the alternately positionable stop member 482 is provided with an arcuate depression forming an arcuate wall having a first end section 514 engageable by the projection 503 of the abutment means 500 when the stop member 582 is in the position shown in FIG. 12 and the outer ring assembly 409 and the inner ring assembly 410 are rotating in a clockwise direction; and a second arcuate wall 515 is provided which, when the stop member 482 is in the alternate position from that shown in FIG. 12, will engage the projection 503 of the abutment means 500 when the outer ring assembly 409 and the inner ring assembly 410 are rotating in a counter-clockwise direction, whereby the stop member 582 is alternately positionable depending upon the direction of rotation of the ring assemblies.

In order to prevent inadvertent shifting of the alternately positionable stop member 482 away from either of its alternate positions, spring-loaded detent means 516 are provided in the stop member 482 engageable in spaced depressions 514a and 515a in the outer flange 432 when the stop member 482 is in its alternate positions. Such detent means 516 is seen in FIG. 17 as being engaged in the ball engaging depression 514a to retain the stop member 482 in the position shown in FIG. 12.

In the use of the tong assembly B described above in combination with a power tong assembly T, the latter will be operated to grip and rotate a joint of pipe, in say a right-hand direction, when a pipe joint is to be made up; and during the initial stages of rotation of the pipe by the tong assembly T, the back-up tong assembly B may remain idle.

To make up the tool joint the power tong will be operated by supplying hydraulic fluid under pressure to the motor 13 so as to effect rotation of the ring gear 415 of the outer ring assembly 409 in a clockwise direction. Such rotation of the outer ring assembly 409 will cause movement of the camming section 447a of the inner peripheral wall 447 of the outer ring body 413 relative to the respective bearing sleeves 446 of the several pipe engaging jaws 411 so s to effect radial inward movement of the jaws in unison. Such inward movement of the jaws 411 will effect engagement of the dies 460 with the tool joint 1 of the pipe P1. Such inward movement of the jaws 411 into engagement with the tool joint 1 will then cause the inner ring assembly 410 to rotate in a right-hand direction along with the outer ring assembly 409 causing thereby threaded coengagement of the tool joint section 1 with the tool joint section 2 of the pipe P2 which is disposed in the back-up tong assembly B. When the tool joint sections 1 and 2 shoulder and it is desired that the pipe P2 be held fast against rotation during the application of high make up torque to the pipe P1 by the power tong T, it is desired that the back-up tong B be operated to resist rotation of the pipe P2 in a right-hand direction. Under these circumstances, the ring actuator cylinder 266 of the actuator means 265 should be in the angular position shown in FIG. 3, with the latch pin 289 connecting the actuator rod 269 to the jaw carrying ring assembly 220 so as to effect right-hand rotation of said ring assembly when pressure fluid is applied to the cylinder 266 to project the rod 269 therefrom. Such right-hand rotation of ring 220 will cause angular movement thereof relative to the stationary plate 217 and the cam ridge 251 formed on the latter, so that the jaw closing rollers 252 will progressively move along the cam walls 251b, forcing the jaws 230 toward one another into gripping engagement with the pipe joint 2. Thereafter, the tendency of the pipe P2 to rotate to the right with the pipe P1 will cause a corresponding tendency of the jaw carrying ring 220 to rotate to the right, thereby further energizing the camming action of the back-up tong assembly and forcing the jaws 230 into tighter gripping engagement with the pipe P2.

Following make up of the tool joint the back-up tong B will be released from the joint section 2 of the pipe P2 by the reverse application of pressure fluid to the cylinder 266 to retract the rod 269, effecting left-hand rotation of the ring 220 relative to the plate 217 and the cam ridge 251, to open the jaws 230 of the back-up tong B. In order to open the jaws 411 of the power tong T, pressure fluid will be supplied to the motor 13 so as to drive the ring gear 415 in a left-hand direction. Such rotation of the ring gear 415 will effect retraction of the jaws 411 in response to engagement of the cam follower lug 452 with the cam surface 451 provided by the cam ridge 412. As the jaws 411 are retracted the stop surface 485 of the traveling stop member 481 carried by the outer ring assembly 409 will engage the end 494 of the alternately positionable stop member 482, as shown in FIG. 12, to thereafter cause simultaneous movement of the inner ring assembly 410 with the outer ring assembly 409.

Conversely, when the power tong assembly T is being employed to break out pipe joints by rotating the pipe P1 to the left, initial high torque loads will be imposed on the pipe joint and the back-up tong B should be engaged with the joint 2 to prevent left-hand rotation thereof. In order to condition the power tong T for break out operations the alternately positionable stop member 482 should be shifted from the position shown in FIG. 12 to its alternate position, whereby to allow left-hand rotation of the outer ring assembly 409 relative to the inner ring assembly 410 to effect closure of the jaws 411 upon the tool joint 1 of the pipe P1, and then to cause left-hand rotation of said tool joint part. In order to shift the stop member 482, air under pressure is supplied to the passage 505a of the abutment means 500 so as to cause movement of the projection 503 to the position shown in broken lines in FIG. 18, in which position the projection 503 is disposed in the path of movement of the face 514 of the stop member 482 as the outer ring assembly 409 moves in a right-hand direction carrying the inner ring assembly 410 therewith, by virtue of engagement of the traveling stop 482 with the traveling stop member 481. When the stop member 482 has been shifted by the abutment means projection 503 the power tong assembly T is in condition for breaking out tool joints. Under these circumstances, the operator will also effect release of the latch pin 289 of the back-up tong B and will cause the application of fluid pressure to the actuator cylinder 283 to retract rod 285, thereby shifting the ring actuator cylinder 266 over-center into engagement with the abutment 281, whereupon the latch pin 289 may be re-engaged by the spring 297. Then, application of fluid pressure to the cylinder 266 will cause left-hand rotation of the jaw carrying ring 220 which will cause movement of the rollers 252 along cam surfaces 251c, thereby effecting closure of jaws 230 on the pipe joint 2. Any tendency of the joint part 2 to rotate to the left along with the pipe P1 will again effect self-energization of the back-up tong B, whereby the jaws will be more firmly forced into gripping engagement with the joint part 2.

What is claimed is:

1. In tong apparatus for making up and breaking out joints in well pipe, said joints being composed of threaded pipe parts, a support structure, pipe engaging means carried by said support structure for relative angular movement thereof, means for effecting such angular movement, said pipe engaging means including a ring, jaws carried by said ring and movable between pipe engaging and retracted positions, means for moving said jaws between said positions in response to angular movement of said ring in opposite directions, said last-mentioned means comprising a cam ridge on said support structure, cam follower means on said jaws engaged with said cam ridge for camming said jaws to both of said positions upon angular movement of said ring in opposite directions, and said support structure including an outer ring, said first-mentioned ring being carried in said outer ring for relative angular movement, and the means for effecting said angular movement comprising power driven means for rotating said outer ring in opposite directions.

2. Tong apparatus as defined in claim 1, including reverse stop means for limiting said angular movement in one direction to cause simultaneous angular movement of both of said rings following movement of said jaws to said retracted positions.

3. Tong apparatus as defined in claim 1, including reverse stop means for limiting said angular movement in one direction to cause simultaneous angular movement of both of said rings following movement of said jaws to said retracted positions, said reverse stop means including an alternately positionable stop member movable from a first position for limiting said relative angular movement in said one direction to a second position for limiting said relative angular movement in the other direction, and means for moving said stop member between said positions.

4. Tong apparatus as defined in claim 3, wherein said means for moving said stop member between said positions includes abutment means disposable in the path of said stop member and engageable therewith to move the same to opposite positions responsive to said angular movement in opposite directions.

5. Tong apparatus as defined in claim 1, wherein said first-mentioned ring includes means slidably supporting said jaws for said movement between pipe engaging and retracted positions, and said cam follower means includes a jaw retracting cam follower removably connected to each of said jaws, and fastener means connecting said jaw retracting cam follower to the jaw and exposed internally of said first-mentioned ring for removal of said fasteners to allow removal of said jaws from said means slidably supporting said jaws.

6. Power tong apparatus comprising: a tong head including a case defining a pipe opening and an annular channel disposed about said pipe opening, pipe gripping means in said channel including an outer ring rotatably supported in said case, driven gear means for driving said outer ring in opposite angular directions, an inner ring rotatably supported in said outer ring, said inner ring having a plurality of pipe gripping jaws, means slidably supporting said jaws for movement radially with respect to said pipe opening between pipe engaging and retracted positions, first cooperable cam and follower means on said outer ring and said jaws for moving said jaws to said pipe engaging positions upon angular movement of said outer ring relative to said inner ring in either direction, and second cam and follower means on said outer ring and said jaws for moving said jaws to said retracted positions upon reverse angular movement of said outer ring in either direction.

References Cited
UNITED STATES PATENTS

| | | | |
|---|---|---|---|
| 2,846,909 | 8/1958 | Mason | 81—57.18 |
| 2,950,639 | 8/1960 | Mason | 81—57.18 |
| 3,086,413 | 4/1963 | Mason | 81—57.16 |
| 2,933,961 | 4/1960 | Adams | 81—57.18X |
| 2,618,468 | 11/1952 | Lundeen | 81—57.19 |
| 3,380,323 | 4/1968 | Campbell | 81—57.16 |

JAMES L. JONES, JR., Primary Examiner

U.S. Cl. X.R.

81—57.21